Aug. 8, 1950
J. H. POWERS
2,518,176
WATER TEMPERATURE RESPONSIVE CONTROL
FOR WASTE DISPOSAL DEVICES
Filed April 1, 1949
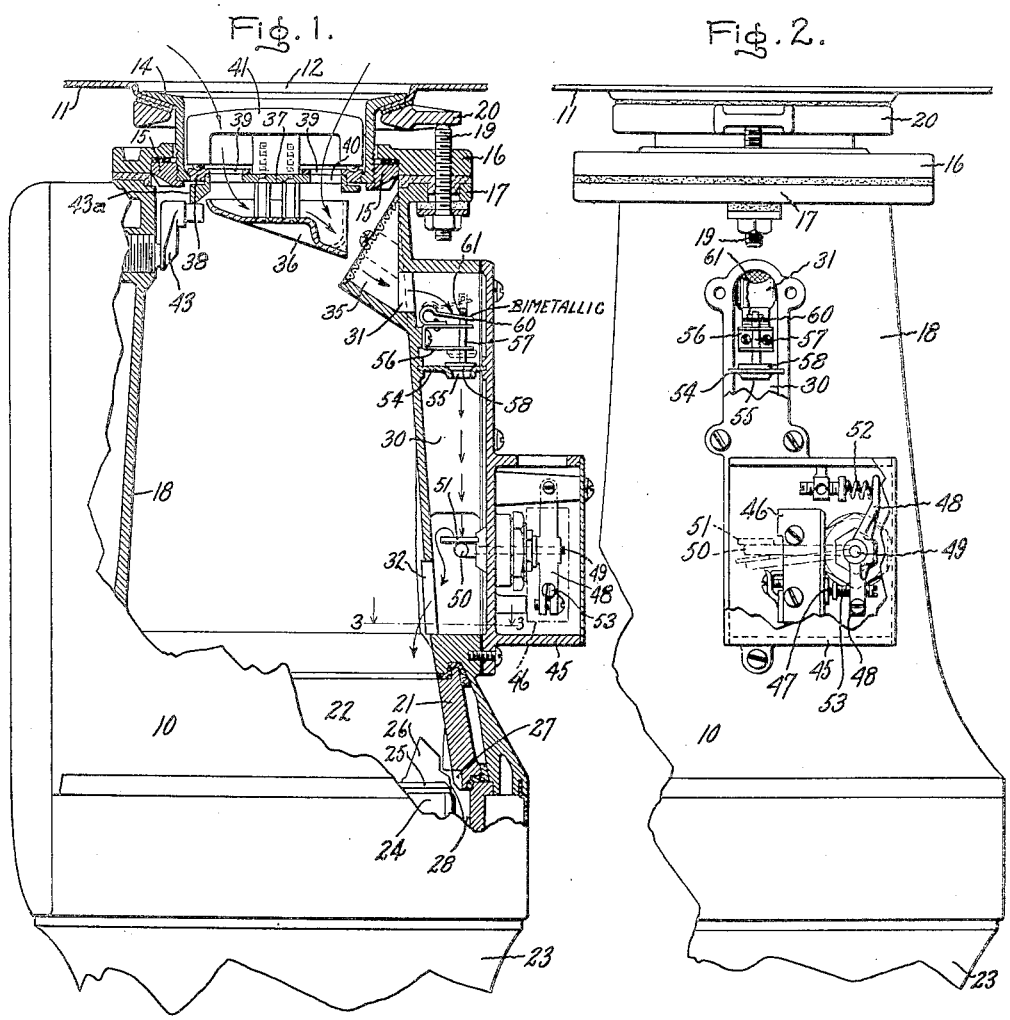
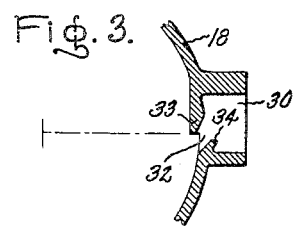
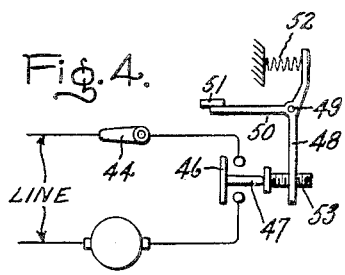
Inventor:
James H. Powers,
by *Sheridan Neale Ruff*
His Attorney.

Patented Aug. 8, 1950

2,518,176

UNITED STATES PATENT OFFICE 2,518,176

WATER TEMPERATURE RESPONSIVE CONTROL FOR WASTE DISPOSAL DEVICES

James H. Powers, Westport, Conn., assignor to General Electric Company, a corporation of New York Application April 1, 1949, Serial No. 85,004

6 Claims. (Cl. 241—36)

This invention relates to an improved control means for kitchen waste disposal equipment of the type affixed to a kitchen sink at the drain opening thereof. In said devices, garbage and other kitchen waste are ground or shredded by a motor operated grinder in the presence of water supplied by the sink tap and the mixture of ground garbage and water is flushed through the conventional trap to the sewer system.

For proper operation, water should be supplied during the entire grinding operation; and to prevent the softening or liquifaction of fat particles in the waste—it has been found that the fat will later harden within the pipes, eventually choking the connections to the sewage system—the water should be below 100° F. In my Patent No. 2,244,402 granted June 3, 1941 for Waste Disposal Apparatus, I have disclosed a flow responsive control adapted to be inserted in the cold water line to the sink on which the garbage grinder is mounted. In the arrangement shown in said patent, a normally open switch in the motor circuit of the unit closes only after water in suitable volume is flowing through the pipe. This system is completely satisfactory in that it prevents grinder operation unless cold water if flowing through the sink tap and thence to the waste food grinder; but it has the practical disadvantage of requiring the breaking of the cold water line for installation of the switch, and running an electrical connection from the switch to the disposal unit beneath the sink. Bearing in mind that the disposal units are most frequently installed in existing buildings and that the water supply lines to the sink may be concealed in the walls, it is obvious that the installation of the independent flow switch may add substantially to the expense of installation.

In my presently copending application S. N. 783,140 filed October 30, 1947 for Water Control for Disposal Unit, of which this application is a continuation, there is disclosed a water flow control mounted directly upon the waste food grinder, and effective to delay operation of the grinder motor until water is actually flowing into the garbage comminution chamber. This apparatus has the advantage of eliminating the necessity of breaking into the cold water supply line and running a separate electrical connection from a flow responsive switch to the motor, but it is not selective as to water temperature; the motor operates as the result of deflection of a switch actuator by water flow, regardless of whether hot or cold water is flowing from the sink tap.

It is therefore an object of the present invention to provide a temperature responsive flow switch for the control of garbage grinder operation; and it is a further object of the invention to incorporate with a flow control switch of the general type shown in my aforesaid application S. N. 783,140, a temperature responsive control valve which will prevent the flow of hot water to the switch actuator and therefore prevent the device from operating when hot water is being supplied thereto.

Other features and advantages of the invention will be apparent from a consideration of the following detailed description, taken in conjunction with the accompanying drawing which indicates a typical embodiment of the invention. In said drawing, Fig. 1 is a partial side elevation of a garbage grinder embodying my invention, said figure being in partial section to better illustrate the inventive subject matter; Fig. 2 is a partial elevation looking toward the control unit, certain cover plates being broken away to reveal underlying structures; Fig. 3 is a fragmentary plan section taken on lines 3—3 of Fig. 1; and Fig. 4 is a schematic wiring diagram.

In the drawing, a garbage grinder 10 is attached to a sink 11 at the drainage opening 12 thereof. The attachment means, now well known in the art and forming no part of the present invention, includes a cup-like member 14 having a rim resting upon the rim of the sink opening. Cup 14 is attached to a ring 15 disposed below a head 16 and a flange 17 extending outwardly from the casing 18 accommodates the clamping screws 19 which pass through head 16 and butt against the clamping member 20 so as to hold the garbage grinder 10 firmly in place beneath the sink. It will be understood there is a plurality of clamping screws 19—usually three—and that by means of resilient gaskets, several of which are shown in Fig. 1, the suspension of the device from the sink is cushioned so as to absorb vibrations and to protect the porcelain or other surface finish against damage. The casing 18 is frusto conical and communicates with a frusto conical structure 21 which defines the actual comminution chamber 22. The two-part casing structure is advantageous in that the comminution chamber wall 21 is subject to abrasion and impact during the operation of the device and must therefore be of a hard, wear-resistant material, whereas the chamber 18 may be of cast aluminum or other suitable light alloy. Suitably affixed to the lower portion of the comminution chamber is a motor housing 23 within which the motor (not shown)

is mounted, the shaft of the motor being vertical and coaxial with the comminution chamber. The motor shaft carries a flywheel structure 24 having a wear-resistant surface 25 which may be in the form of a plate or shoe. The flywheel pivotally mounts a suitable plurality of impeller blades 26 which are biased so that they normally lie substantially flush with the surface of the shoe 25 but move by centrifugal force into the operating position shown in Fig. 1. The lower portion of the comminution chamber wall 21 is formed with grooves or slots defining a suitable plurality of passages 27 which form paths of communication between the chamber 22 and an annular waste chamber 28 which communicates with a suitable outlet connection (not shown). Reference is hereby made to my aforesaid Patent No. 2,244,402 which shows the foregoing structure in detail.

The outer wall of the casing section 18 is formed to provide an elongate passage 30 extending from a wall opening 31 adjacent the upper end of the casing to a slot-like opening 32 through the casing wall immediately above the comminution chamber. As will be apparent from Fig. 3 the opening 32 is characterized by an angular discharge formed by a baffle structure 33 and, where desired, an inwardly extending lip 34. The discharge angle is such that water flowing therethrough will follow a path closely adjacent the inner wall of the casing 18; the clockwise direction of flow corresponds also to the clockwise rotation of the flywheel during the grinding operation. The water flow from the sink faucet during the operation of the device pours into the cup 14 and is then diverted in substantial part into a catch basin 35 communicating with opening 31 by means of a spout 36 secured to a rotatable drainage control plate 37. A plate 38 which is fixed to the bottom of cup 14 has suitable openings 39 for cooperation with the openings 40 in the plate 37. By means of the handle 41 plate 37 and its associated spout 36 may be rotated with respect to the plate 38 to completely close the sink drain, or to permit drainage from the sink into the spout 36 and discharge into the catch basin 35 or, when the handle is rotated 180° with respect to Fig. 1, drainage from the sink directly into the chamber of the device. This latter condition of operation is useful for ordinary sink drainage purposes when the garbage grinder is not being used as such. As explained in my Patent No. 2,185,037 granted December 26, 1939 for Waste Disposal Apparatus, the rotation of the handle 41 and its associated plate 37 controls a normally open switch in circuit with the grinder motor by means of a switch actuator 43 and a cam or projection 43a extending from plate 37. In the wiring diagram of Fig. 4, which shows the circuit when the apparatus is in the operative condition of Fig. 1, the switch is designated 44. When the rotatable top is in said Fig. 1 position the cam 43a rotates the switch actuator 43 so as to close the switch (not shown); but in either of the other two positions of the rotatable top the cam 43a disengages from switch actuator 43 and the motor switch returns to open condition. It will thus be seen that for motor operation of the rotatable top structure must be that in which water flows into the passage 30.

A second switch which must closed before the motor can operate is suitably contained within a housing 45 at the base of the passage 30. This switch, 46, is preferably of the normally closed type which operates to open position by light pressure on its actuating plunger 47. This actuating pressure may be effected by a lever 48 fixed intermediate its ends to a shaft 49 extending through a suitable stuffing box into the passage 30. Shaft 49 carries an elongate lever 50 provided with a relatively large area plate member 51. An adjustable tension spring 52 bearing against an end of lever 48 urges the same clockwise of Fig. 2 so that the head of the adjustable screw 53 presses against the plunger 47 to hold the switch in open circuit position, as indicated in the wiring diagram of Fig. 4.

Disposed within the passage 30 is an orifice plate 54 formed with an orifice 55 aligned above the target 51 as appears from Figs. 1 and 2. It will be apparent that water discharging from the spout 36 into the catch basin 35 and then into passage 30 may under conditions of operation presently described flow through the orifice 55 and strike the plate 51, which is in the direct path of flow. The arm 50 will deflect as the result of water flow energy and rotate lever 48 counterclockwise against the tension of spring 52 to release the switch plunger 47 for operation of the switch to closed position.

Pursuant to the objectives of this invention a temperature responsive control is provided to prevent water from flowing through the orifice 55 unless the temperature thereof is below a predetermined value, for example 100°. To this end I provide a mounting bracket 56 within the passage for the support of a valve stem 57 which terminates in a valve disc 58 associated with the orifice 55 to control flow therethrough. Carried by bracket 56 is a temperature responsive valve control. A practical type of control is a bi-metallic leaf 60 having a hole accommodating the passage of the valve stem 57. The said stem is fixed relative to the bi-metallic actuator by any convenient means such as a pin 61 either above or below the leaf 60, as desired. It will be understood above and below the leaf 60, as desired. It will be understood that the provision of a pin 61 both above and below will effect the positive movement of the valve stem in both directions whereas with pin 61 only above the leaf 60 the closure of the valve will depend on gravity action. The temperature responsive control is so arranged that at any temperature above 100° it will rotate clockwise of Fig. 1 and permit the valve to close under gravity supplemented by flow of water. At temperatures less than 100° the control will swing upwardly carrying with it the valve stem 57 and the orifice 55 will be opened for the passage of water. It is apparent that the control is normally exposed to ambient temperature and will in most instances hold the valve 58 in open position. In the event the user inadvertently turns on the hot water rather than cold, the valve at the orifice 55 will promptly close. The motor may start if the valve 58 had been raised, but it will not continue to operate because when valve 58 closes, there will be no flow of water through the orifice 55 to impinge upon the switch, lever plate 51, and the actuator arm 50 is no longer effective to oppose the spring 52, which thereupon rotates lever 48 to open-circuit position. The user will, of course, very quickly recognize that the apparatus is not operating and after first permitting any hot water accumulation to drain into the discharge 28, will correct the condition by the use of cold water whereupon the temperature responsive control 60 will unseat valve 58. Water flow through the orifice 55 will actuate the switch 46 to closed circuit position to start the motor and grinding operation.

The volume of water flow necessary for switch operation is relatively small. The tangential discharge through the opening 32 insures water flow through the passage 30 even if a substantial amount of garbage has accumulated in the device, because the water will surround the outer edge of the garbage and will readily pass from there through the numerous voids in the garbage mass.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a garbage grinder, a casing defining a chamber for the reception of material to be ground, a motor operated grinding means within said chamber, means for supplying water to said chamber, a conduit disposed externally of said chamber, said conduit having a mouth opening into said chamber and discharging into said chamber above the grinding means, spout means for diverting water flowing into said chamber into the mouth of said conduit, a switch in the motor circuit, means for normally maintaining said switch in open circuit position, a switch actuator including a pivoted arm disposed within said conduit and having an enlarged end portion, said pivoted arm rotating under the force of water flow through said conduit to move said switch to closed circuit position, an orifice disposed within said conduit upstream of said actuator arm end portion and in alignment therewith to place said end portion directly in the path of water flow, valve means within said conduit in operative association with said orifice, and a bimetallic member fixed relative to said conduit and having an arm therein, said member engaging said valve means to operate the same for flow through said orifice when the water temperature entering said conduit is below a predetermined value and to close said orifice at a temperature above said value, whereupon in the latter circumstance the interruption of water flow through said conduit will render the switch actuator ineffective to prevent a return of the switch to open circuit position.

2. In a garbage grinder, a casing defining a chamber for the reception of material to be ground, a motor operated grinding means within said chamber, means for supplying water to said chamber, a conduit disposed externally of said casing, said conduit having a mouth communicating with said chamber near the top thereof and discharging into said chamber above the grinding means, spout means within said chamber to divert inflowing water into said conduit, a switch in the motor circuit, means for normally maintaining said switch in open circuit position, a switch actuator including a pivoted arm disposed within said conduit and deflectable upon fluid flow through said conduit to move said switch to closed circuit position, the free end of said arm having a plate of relatively large area directly in the path of fluid flow, an orifice disposed within said conduit above said target, and temperature sensitive valve means for closing the orifice when the water flowing into the conduit exceeds a predetermined value, whereupon the cessation of water flow at said switch actuator will render the same ineffective to hold the switch against return to open position.

3. In a garbage grinder, a casing defining a chamber for the reception of material to be ground, a motor operated grinding means within said chamber, means for supplying water to said chamber, a conduit disposed externally of said casing, said conduit having a mouth communicating with said chamber near the top thereof and discharging into said chamber above the grinding means, means for diverting water from said chamber into the mouth of said conduit, a switch in the motor circuit, means for normally maintaining said switch in open circuit position, a switch actuator including a pivoted arm disposed within said conduit and deflectable upon fluid flow through said conduit to move said switch to closed circuit position, a valve in said conduit upstream of said arm for controlling flow through said conduit, and valve operating means of the thermally deformable type responsive to the temperature of water entering said conduit to close the valve at a water temperature above a predetermined minimum, whereby the switch actuator will no longer be effective to hold the switch against return to normally open position.

4. In a garbage grinder, a casing defining a chamber for the reception of garbage to be ground, a motor operated grinding means in said chamber, means for supplying water to said chamber, a conduit extending from an inlet disposed near the mouth of the chamber to an outlet near the bottom thereof, means for causing water supplied to said casing to flow through said conduit, a switch in the motor circuit, a switch actuator disposed in the path of water flow through said conduit and effective to close said switch only in the presence of water flow, valve means in said conduit for controlling water flow to said switch actuator, temperature sensitive means having an element movable relative to said valve means in response to a rise in the temperature of the water entering said conduit, and means mechanically associating said movable element and said valve means to operate the latter to closed position resulting from such movement of said element.

5. In a garbage grinder, a casing defining a chamber for the reception of garbage to be ground, a motor operated grinding means in said chamber, means for supplying water to said chamber, a conduit externally of said chamber and communicating with said chamber adjacent the top and bottom thereof, a switch in the motor circuit, means to divert water entering said chamber into said conduit, means dependent upon flow through said conduit to close said switch, and a valve responsive to the temperature of water within said conduit to stop flow therethrough when said temperature exceeds a predetermined minimum.

6. A garbage grinder, comprising a casing defining a chamber for the reception of garbage to be ground, a motor operated grinding means at the bottom of said chamber, means for supplying water to said chamber, a conduit extending from an inlet disposed near the mouth of said chamber to an outlet near the bottom thereof, means optionally adjustable to positions respectively causing water from said supplying means to flow directly into said casing or substantially wholly into said conduit, a first and a second switch serially connected in the motor circuit, means for operating said first switch to closed circuit position upon adjustment of said water directing means to the second-named position, switch actuator means disposed in the path of water flow through said conduit and effective to close said second switch only in the presence of water flow, valve means within said conduit upstream of said actuator means for controlling flow thereto, and valve operating means responsive to the temperature of water in said conduit to close said valve means when the water temperature exceeds a predetermined value.

JAMES H. POWERS.

REFERENCES CITED

The following references are of record in the file of this patent:

UNITED STATES PATENTS

| Number | Name | Date |
| --- | --- | --- |
| 2,220,729 | Powers | Nov. 5, 1940 |
| 2,244,373 | Powers | June 3, 1941 |
| 2,244,402 | Powers | June 3, 1941 |
| 2,418,366 | Powers | Apr. 1, 1947 |
| 2,442,812 | Jordan | June 8, 1948 |
| 2,469,205 | Powers | May 3, 1949 |

---

Certificate of Correction

Patent No. 2,518,176             August 8, 1950

JAMES H. POWERS

It is hereby certified that error appears in the printed specification of the above numbered patent requiring correction as follows:

Column 4, line 39, after the word "or" insert *above and*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*